United States Patent [19]

Huyer

[11] Patent Number: 5,040,845
[45] Date of Patent: Aug. 20, 1991

[54] SLIDING ROOF FOR A VEHICLE

[75] Inventor: Johannes N. Huyer, Velserbroek, Netherlands

[73] Assignee: Vermeulen-Hollandia Octrooien II B.V., Netherlands

[21] Appl. No.: 474,442

[22] Filed: Feb. 1, 1990

[30] Foreign Application Priority Data

Feb. 1, 1989 [NL] Netherlands .................. 8900251

[51] Int. Cl.⁵ .................................... B60J 7/053
[52] U.S. Cl. ............................ 296/222; 296/213; 296/217; 296/223; 296/224
[58] Field of Search .............. 296/216, 217, 222, 223, 296/220, 224, 213

[56] References Cited

U.S. PATENT DOCUMENTS 3,975,048  8/1976  Matusek ........................ 296/216
4,626,024 12/1986  Swann ........................... 296/216
4,630,858 12/1986  Bez ............................ 296/216 X

FOREIGN PATENT DOCUMENTS 3442652  6/1986  Fed. Rep. of Germany ...... 296/222
1431241  1/1966  France ......................... 296/222
 20660   of 1913 United Kingdom ............. 296/216
573355  11/1945  United Kingdom ............. 296/220
730742   5/1955  United Kingdom ............. 296/216

Primary Examiner—Dennis H. Pedder
Attorney, Agent, or Firm—Kinney & Lange

[57] ABSTRACT

A sliding roof for a vehicle of which the fixed roof (1) is provided with a roof opening (2), comprises a longitudinal guide (4) near both longitudinal edges of the roof opening (2). A panel (3) is slidably guided in the longitudinal guides (4) such that the panel (3) is adapted to be slid from a closed position in which it closes the roof opening (2) both rearwardly and forwardly under the fixed roof (1) to open the roof opening (2).

11 Claims, 6 Drawing Sheets

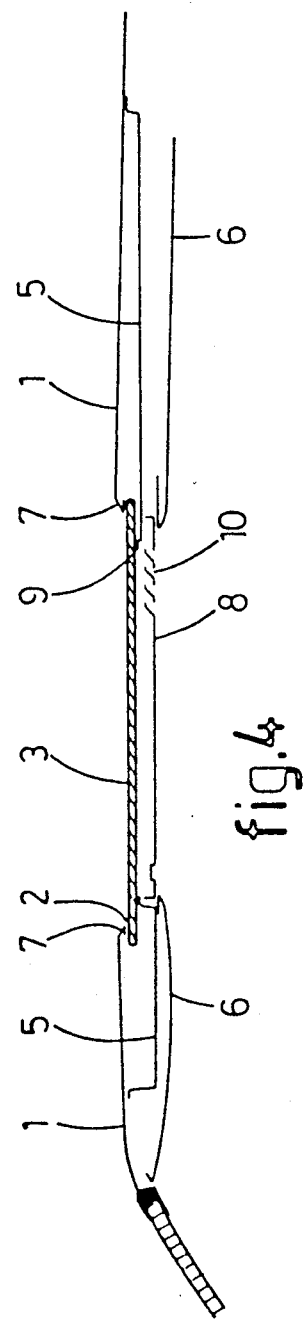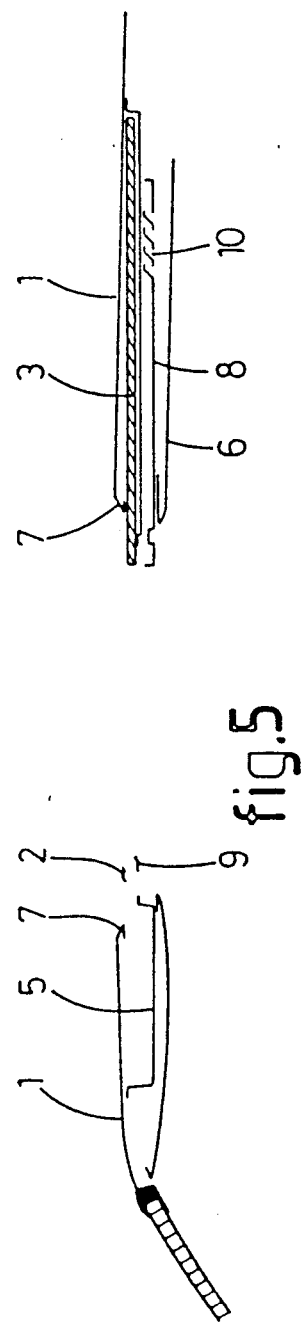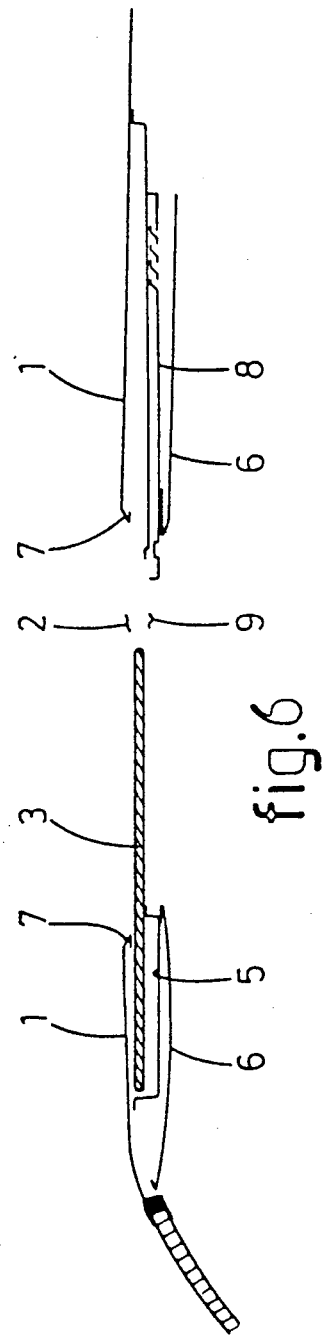

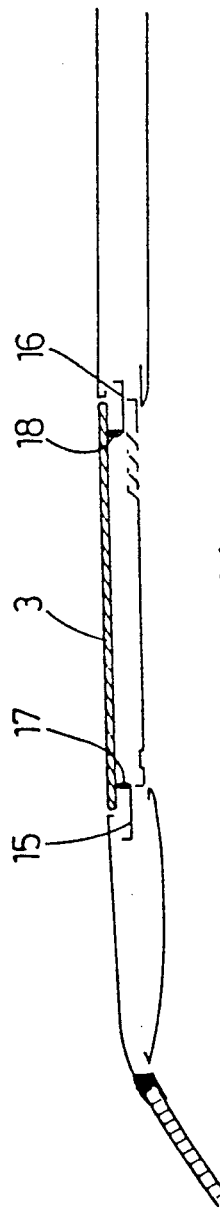
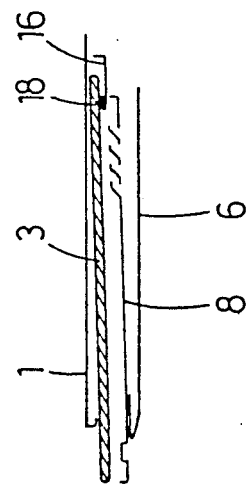
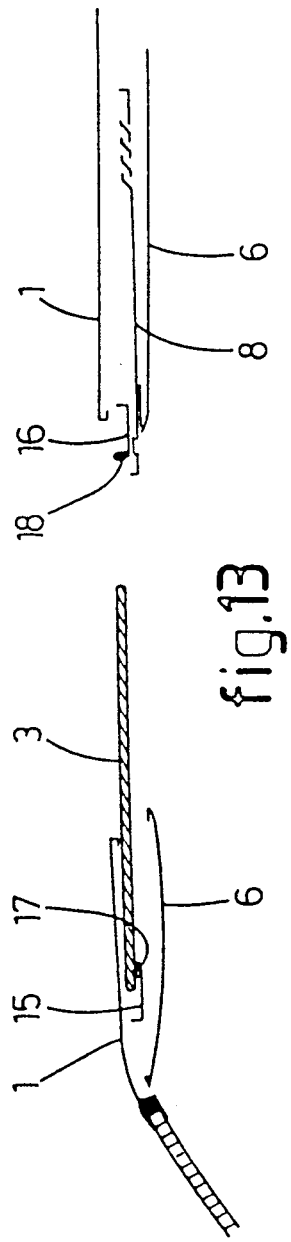
fig.11
fig.12
fig.13

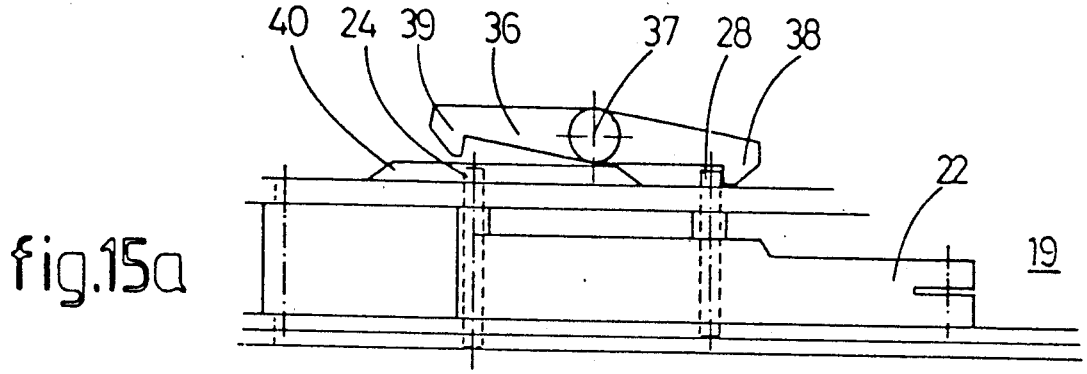
fig.15a
fig.15b
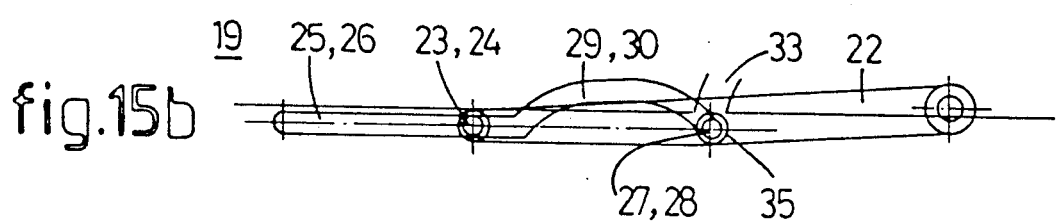
fig.16a
fig.16b
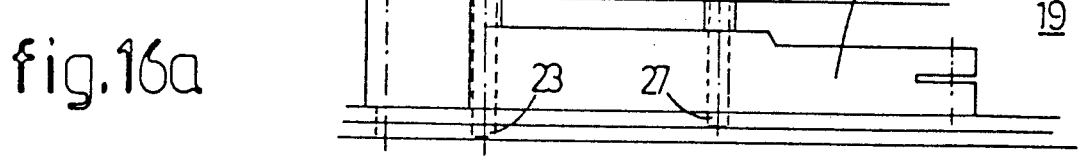
fig.17a
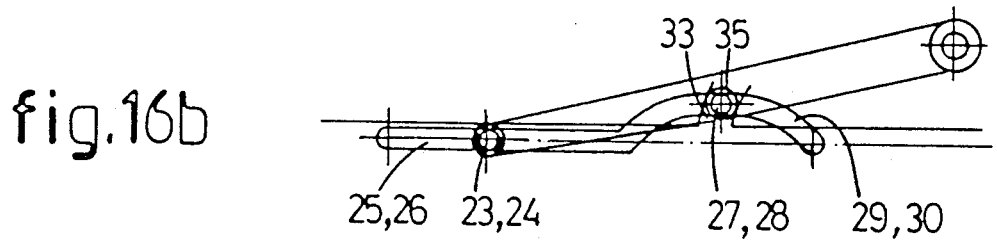
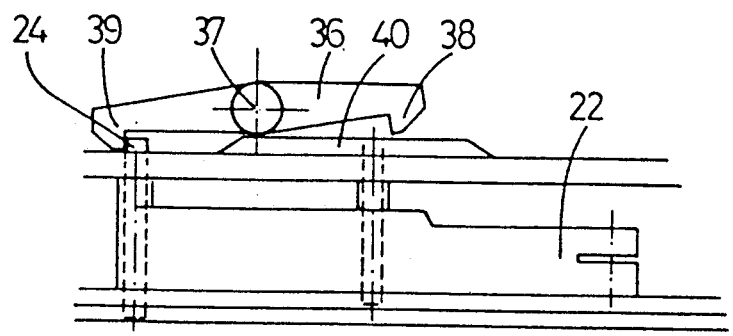
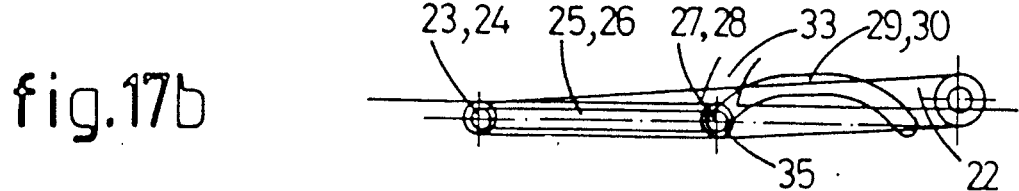
fig.17b ized in that the panel is
SLIDING ROOF FOR A VEHICLE The invention relates to a sliding roof for a vehicle of which the fixed roof is provided with a roof opening, comprising a panel which is displaceable between a closed position in the roof opening and an open position.

Sliding roofs are known in various embodiments. The ever increasing demand for more comfort in the vehicle, in particular the passenger car, has led to the situation that the sliding roof design always had to meet new and stricter requirements. The type of sliding roof that was best able to meet these requirements is the so-called tilt-sliding roof, wherein the panel is adapted to be moved between a closed position in the roof opening and backwardly slid positions under the fixed roof on the one hand and between the closed position and upwardly tilted inclined positions on the other hand. However, a disadvantage of this type of sliding roof is that the rather complicated movement of the panel requires an adjusting mechanism demanding a large built-in height thereby losing a lot of head room for the passengers of the car. The adjusting mechanism has also become more and more complex which has increased the cost price of the sliding roof more and more.

It is an object of the invention to provide a sliding roof which is able to meet the strict comfort requirements on the one hand and needs only a small built-in height and can be manufactured cheaper on the other hand.

For this purpose the invention proposes a sliding roof for a vehicle of which the fixed roof is provided with a roof opening, comprising a longitudinal guide near both longitudinal edges of the roof opening, and a panel being slidably guided in the longitudinal guides such that the panel is adapted to be slid from a closed position in which it closes the roof opening both rearwardly and forwardly with respect to the fixed roof to at least partially open the roof opening. Preferably, the panel is slid under the fixed roof.

As a result of the possibility to slide the panel from the closed position both rearwardly and forwardly it is necessary to selectively provide an opening on the front and rear side of the panel, as in a tilt-sliding roof. Since the panel basically has to perform only a sliding movement it is sufficient to use a relatively simple adjusting mechanism requiring little built-in height.

A very simple embodiment of the sliding roof according to the invention is characterized in that the panel, in its closed position, is lying under the roof opening and a seal for the panel extends downwardly from the fixed roof about the roof opening.

Due to this feature the opening and closing of the panel only requires a mere sliding movement permitting a very simple structure of the adjusting mechanism. Principally, the panel can be supported directly by guide shoes that are slidably guided in the longitudinal guide.

In this embodiment it is favorable if the panel is larger than the roof opening and the seal engages on the upper side of the panel.

Because the panel is larger than the opening in the fixed roof the sliding roof is extremely burglar proof since the panel cannot be forced outwardly and, in case the panel is made of glass, it is then only possible to break in the car through the sliding roof by smashing the glass of the panel. Also the protection of the panel from being "blown-out" is optimal in this embodiment. The sealing on the upper side of the panel can be constructed in a very simple way, for example in the manner of a slidable side window of a car door. Consequently, also the tolerances of the dimensions of the panel are far less critical.

A further embodiment of the sliding roof according to the invention is characterized in that the panel, in its closed position, is lying within the roof opening and is moved first downwardly from the closed position before it is slid backwardly and forwardly, respectively.

In this embodiment a small height adjustment should consequently take place, but since only a small displacement in vertical direction is needed the adjusting mechanism can nevertheless have a small built-in height and a simple structure.

This embodiment it is advantageous when the substantially rectangular panel is supported near each of the four corners by a slide through an adjusting means and wherein the slides are guided in the respective longitudinal guide on either side of the panel, wherein it is possible that the adjusting means comprises a lever pivotable about a horizontal transverse shaft and pivotally connected to the panel at one end.

In an embodiment of the sliding roof wherein the panel is made of transparent material, such as glass, and there is also provided a slidable sunshade, it is favorable when the longitudinal guides are attached to a stationary frame and wherein the panel is slidable rearwardly and forwardly between the frame and the fixed roof, and the sunshade is slidable rearwardly between the frame and a roof lining of the vehicle.

A remarkably simple embodiment of the sliding roof according to the present invention is characterized in that the longitudinal guide is attached directly to the vehicle, and front and rear water gutters being slidably guided in the longitudinal guide such that, in the closed position of the panel, the front and rear water gutters are lying under the front and rear edges, respectively of the roof opening while, in the rearwardly displaced positions of the panel, the rear water gutter moves along with the panel and while, in forwardly displaced positions, the front water gutter moves along with the panel.

Due to this construction the built-in height of the sliding roof can be further decreased since the stationary frame is omitted. In this case the vehicle roof, to which the longitudinal guides are attached, lends rigidness to the unit. Between the structure of the sliding roof and the mounting into the vehicle, the several parts of the sliding roof may be fixed relatively to each other by means of a fixture or such tool.

A special embodiment of the sliding roof according to the invention is characterized in that the panel is provided with a wind deflector near its rear side. The wind deflector is positioned in a operative position and moves along with the panel when the panel is in forwardly displaced positions.

This special wind deflector provides more or less an imitation of the inclined venting position of the panel of a tilt-sliding roof wherein, when the vehicle is driving, a vacuum is created on the rear side of the panel causing air to be sucked from the interior of the vehicle thereby effectuating a good ventilation thereof.

The invention will hereafter be elucidated with reference to the drawing showing a number of embodiments of the sliding roof according to the invention by way of example and in a very schematic way.

FIG. 4–6 are schematical longitudinal sectional views of an embodiment of the sliding roof according to the invention, also in three different positions.

FIG. 11–13 are sectional views corresponding to those of FIG. 4–6, showing a further modified embodiment of the sliding roof according to the invention.

FIG. 15–17 are very schematic plan views and side views respectively of the support and adjusting means of FIG. 14 in three different positions.

In the various figures like parts are indicated with the same reference numerals.

Figure 1:
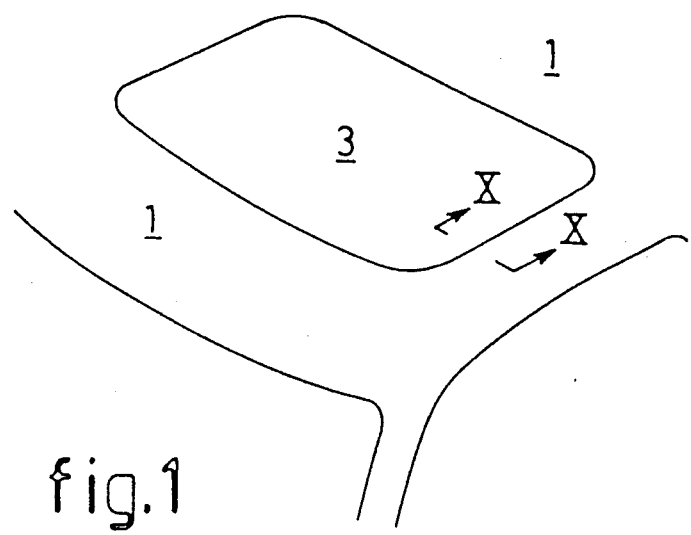
FIG. 1–3 are fragmentary schematic perspective views the invention, in three different positions.
Figure 2:
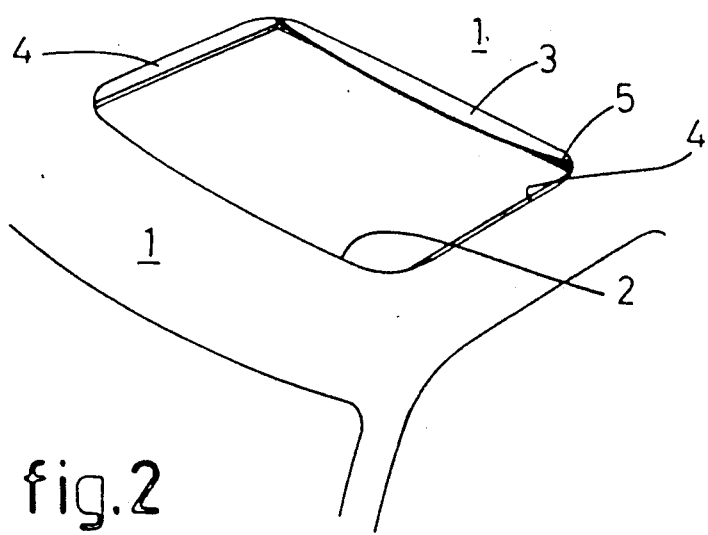

The drawing shows a sliding roof for a vehicle, in this case a passenger car, of which the fixed roof 1 is provided with a roof opening 2. The sliding roof comprises a panel 3 which, in the embodiment shown by way of example, is made of a transparent material such as glass, but which can also be made of non-transparent material such as metal. The panel 3 closes the roof opening 2 in the fixed roof 1 in its closed position (FIG. 1). From this closed position the panel 3 may be slid rearwardly under the fixed roof 1 to wholly or partially open the roof opening 2 (FIG. 2).

Figure 3:
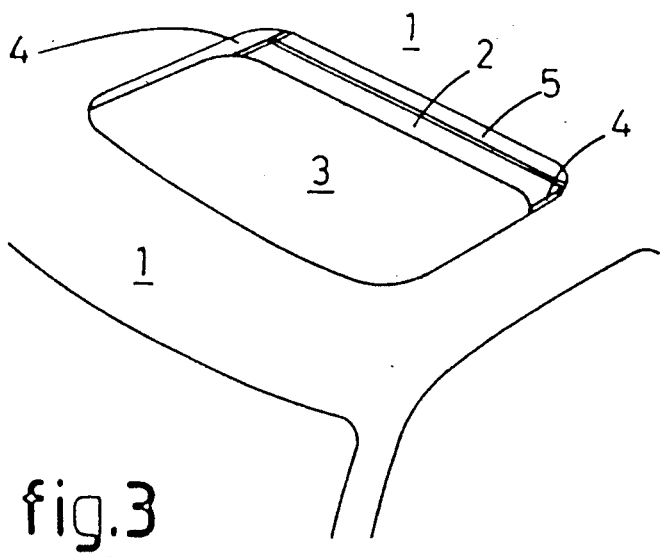

According to the invention, the panel 3 is additionally permitted to be slid from the closed position of FIG. 1 forwardly under the fixed roof 1, so that an opening behind the rear edge 3 is released (FIG. 3).

The panel 3 is slidably guided on both longitudinal sides in a respective longitudinal guide 4 extending near both longitudinal edges of the roof opening 2 and along the extension thereof.

In the embodiment of FIG. 4–6 the longitudinal guides are supported by a stationary frame 5 attached under the fixed roof 1 of the vehicle and hidden from view by a roof lining 6 of the vehicle. It is noted that in FIG. 4–6 the front side of the vehicle is on the left side of the drawing so that FIG. 5 shows the fully rearwardly slid position of the panel 3 and FIG. 6 illustrates the fully forwardly slid position of the panel 3.

In the embodiment of FIG. 4–6 basically the panel 3 is slid only within one plane in the longitudinal direction of the vehicle. In the closed position according to FIG. 4 the panel 3 is positioned under the roof opening 2. To obtain nevertheless a complete sealing of the roof opening 2 the circumference of the roof opening 2 is provided with an inwardly and downwardly inclined edge 7 engaging, in the closed position of the panel 3, onto the upper side thereof by means of a seal (not shown) which can be constructed similar to the seal of a slidable side window of the vehicle. For this purpose it is favorable when the panel 3 is slightly larger than the roof opening 2. In this way the sliding roof is extremely burglar proof since the burglary is then only possible by smashing in the panel. The protection of the panel from being "blown out" is optimal. The tolerances of the dimensions of the panel 3 are also far less critical than with panels wherein the sealing takes place around the circumference thereof.

The sliding roof of FIG. 4–6 is further equipped with a sunshade 8 closing a passage opening 9 in the frame 5 in its front position and being adapted to be slid manually to the rear between the rear portion of the stationary frame 5 and the rear portion of the roof lining 6 in order to permit light to enter the interior of the vehicle. Near the rear side the sunshade 8 is provided with venting apertures 10 to permit some ventilation to take place also when the sunshade 8 is in its closed position.

Figure 7:
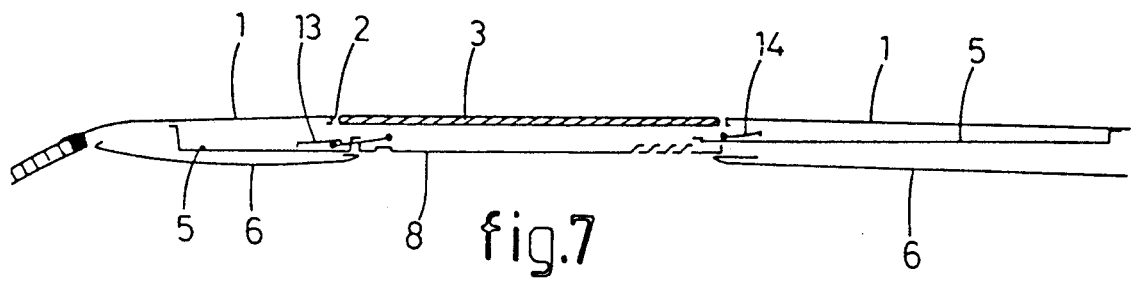
FIG. 7–9 are sectional views corresponding to those of FIG. 4–6 showing a modified embodiment of the sliding roof according to the invention, as shown in FIG. 1–3.

FIG. 7–10 show a modified embodiment of the sliding roof according to the invention having as a difference with respect to the embodiment of FIG. 4–6 that the panel 3 is flush with the fixed roof 1 of the vehicle in its closed position. For this purpose the panel 3 should be provided with a height adjusting means for lifting and lowering the panel 3 to and from its closed position in the 5 roof opening 2 (FIG. 7). An example of such an adjusting means for the panel 3 will be elucidated in more detail with reference to FIG. 14–17. The panel 3 is adapted to be slid rearwardly (FIG. 8) or forwardly (FIG. 9) from the lowered position thereof.

Figure 10:
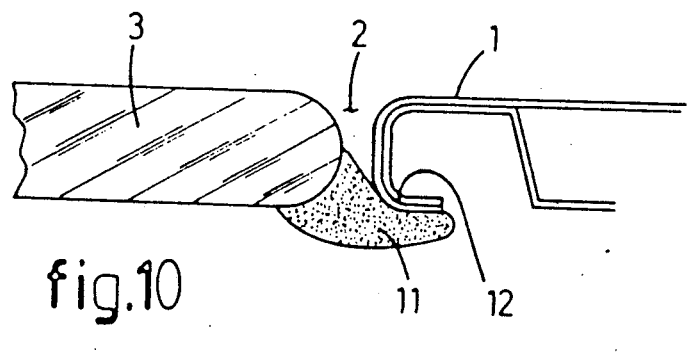
FIG. 10 is an enlarged sectional view along the line X—X of FIG. 1 illustrating a seal of the panel.

The sealing of the panel 3 to the fixed roof 1 of the vehicle is illustrated in FIG. 10. As can be seen, a seal 11 arranged around the circumference of the panel 3 engages under a flange 12 of the fixed roof 1 at the circumference of the roof opening 2.

At the front edge of the roof opening 2 there is provided a 'wind deflector 13 adjustable in vertical direction and being positioned in the upper operative position when the panel 3 is displaced rearwardly from the closed position, and being positioned in a lower in operative position when the panel 3 is in a closed position or is displaced forwardly from this closed position. The front wind deflector 13 can be of a conventional design.

According to the invention, there can be arranged a rear wind deflector 14 on the rear side of the panel 3, the rear wind deflector 14 being in a upper operative position and follows the sliding movements of the panel 3 when the panel 3 is displaced forwardly from the closed position. This realizes the same effect as with a panel that is moved into a backwardly and upwardly inclined venting position, that is, when the vehicle is driving, to produce a vacuum behind the rear edge of the panel 3 so that air is permitted to be sucked out of the interior of the vehicle. When the panel 3 is closed or is displaced rearwardly from the closed position, the rear wind deflector 14 is in a lower inoperative position in which it follows the sliding movements of the panel 3. The front wind deflector 13 and the rear wind deflector 14 may of course be used independent from each other.

Figure 8:
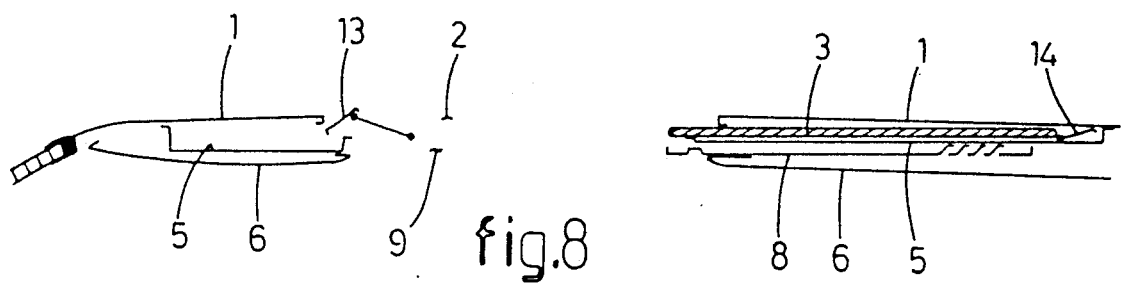
Figure 9:
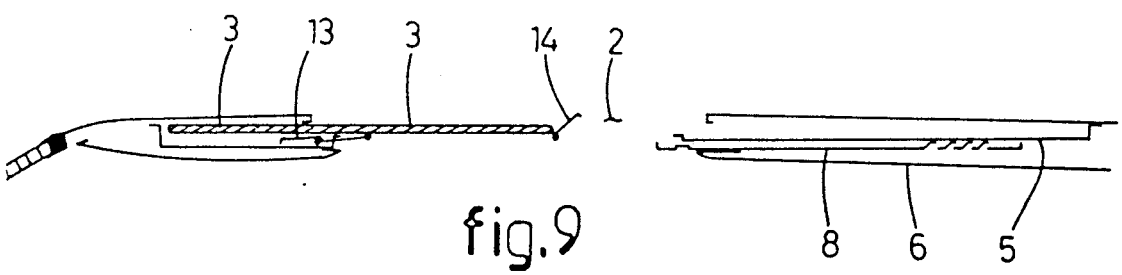

FIG. 11–13 show an embodiment of the sliding roof according to the invention which substantially corresponds to that of FIG. 7–9. The difference is to be seen in that no stationary frame is used in this embodiment. Both longitudinal guides for guiding the panel 3 are directly attached to the 5 vehicle roof 1 without interposition of the frame. Between both longitudinal guides there extend not only the panel 3 but also two transverse water gutters 15 and 16 respectively. Both water gutters 15, 16 are guided with both of their ends slidably in respective longitudinal guides and each of them slides in a different portion of the sliding movement of the panel 3. In the closed position of FIG. 11, the front water gutter 15 is under the front edge of the roof opening 2 while the rear water gutter 16 lies under the rear edge of the roof opening 2. When the panel 3 is displaced from the closed position rearwardly, there is effected a coupling between the panel and the rear water gutter 16 so that the rear water gutter 16 slides with the panel 3 while the front water gutter 15 remains under the front edge of the roof opening 2 when the panel 3 is in rearward displaced positions. In the forwardly displaced positions of the panel 3 the situation is opposite. The front water gutter 15 moves along with the panel 3 while the rear water gutter 16 remains stationary under the rear edge of the roof opening 2.

The facing edges of the water gutters 15 and 16 are equipped with upright seals 17, 18 respectively which are adapted to engage onto the lower side of the panel 3 and to deform in vertical direction in order to set off the displacement of the panel 3 in vertical direction.

The building-in operation of this embodiment of the sliding roof according to the invention having no stationary frame is as follows. In the production plant the various components are pre-assembled and fixed with respect to each other by means of a fixture or the like. The components of the sliding roof remain in this fixture until the longitudinal guides are attached directly to the fixed roof of the vehicle. After this attachment the sliding roof has sufficient rigidness due to the fixed roof 1 of the vehicle so that the fixture may be removed. In this manner it is possible to realize a simple sliding roof having a very small built-in height.

Figure 14:
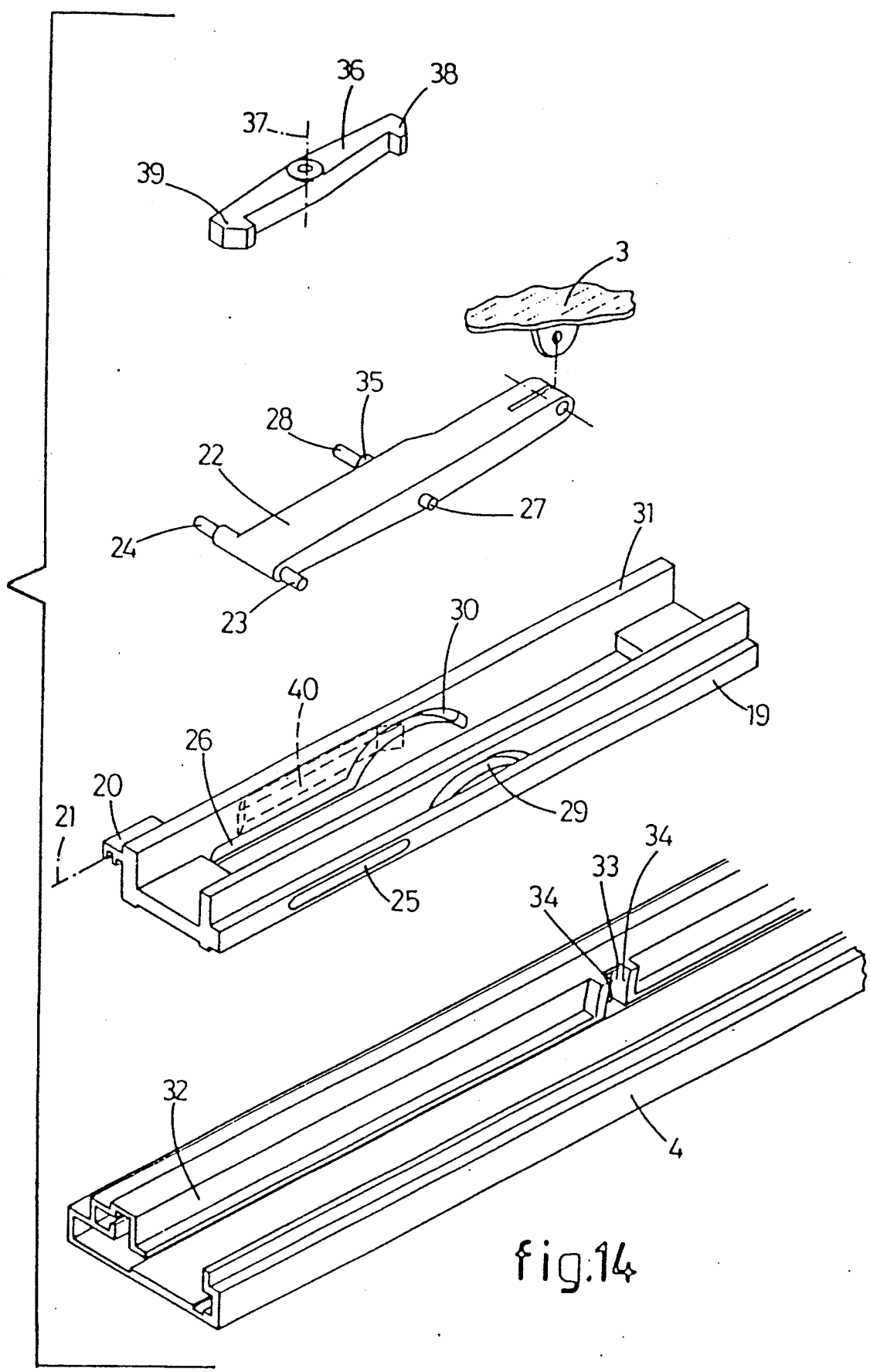
FIG. 14 is a perspective exploded view of one of the support and adjusting means of the adjusting mechanism for the panel.

FIG. 14-17 shows a part of a height adjusting means for the panel. FIG. 14 illustrates a portion of one of the longitudinal guides 4 in which a slide 19 is slidably guided. Onto a bracket 20 of the slide engages a pull and push cable 21 schematically indicated by a dot and dash line and adapted to be adjusted by means of an electric motor or a manual crank.

In the slide 19 a lever 22 is adjustably arranged. The lever 22 is pivotally connected with its upper end to the panel 3 by means of a pivot pin (not illustrated). At its front lower end the lever 22 is provided with a transverse pin projecting on both of its ends, and both extreme pin parts 23, 24 respectively of the pin engage into a respective slot 25, 26 respectively in the slide 19. Substantially halfway along the lever 22 there is provided in the lever 22 a transverse pin, both extreme pin parts 27 and 28 of which are slidably received in a respective guide slot 29, 30 respectively and serve as forcing guide for the lever 22. The slots 25, 29 and 26, 30 respectively may be constructed as separate slots or as continuing slot. The slots 29 and 30 are formed as a segment of a circle and are symmetrically with respect to a vertical transverse plane.

An upright wall 31 of the slide 19, in which the slots 26 and 30 are formed, is guided with its inner side along a flange 32 of the longitudinal guide 4. The flange 32 and the slot 30 in the wall 31 of the slide 19 are in overlapping relationship. In the flange 32 of the longitudinal guide 4 is formed a recess 33 having guide walls 34 for receiving, in the closed position of the panel 3, a shoulder 35 of the lever 22 arranged around the guide pin part 28. As a result, in the closed position of the panel 3, the lever 22 and consequently the panel 3 are locked against a displacement in the longitudinal direction of the vehicle. In the rearward and forward displaced positions of the panel 3 the shoulder 35 of the lever slides along the lower side of the flange 32 of the longitudinal guide and locks in this manner a displacement of the lever 22 in vertical and longitudinal direction with respect to the slide 19.

In the stationary longitudinal guide 4 near the track of the slide 19 a tumbler 36 is mounted freely rotatable about a vertical shaft 37. On both of its ends the tumbler 36 carries hook-like parts 38, 39 directed to the track of the slide 19 and adapted to come into engagement with the pin parts 28, 24 respectively of the lever 22 in order to form a stop for the lever 22. A rib 40 formed on the outer side of the wall 31 of the slide 19 and having sloping run-on faces at the ends thereof is adapted to come into contact with the hook-like parts 38, 39 in order to release or convert the stop action.

The operation of the adjusting mechanism for the panel 3 will now be elucidated with reference to FIGS. 15-17.

FIG. 15a and 15b show the adjusting mechanism in the position in which the panel 3 has just arrived under the roof opening 2 from the forwardly slid position. Then the lever 22 is in its rear position with respect to the slide 19 in which the guide pin parts 27 and 28 are at the rear free end of the guide slots 29 and 30. The lever 22 is then pivoted fully downwardly. In the position of FIG. 15b the guide pin part 28 of the lever 22 has just arrived between the hook-like part 38 of the tumbler 36 so that the lever is locked against a further rearward longitudinal displacement and it can no longer follow a further rearward sliding motion of the slide 19. The tumbler 36 is forced into the stop position shown in FIG. 15b by the co-operation between the rib 40 of the slide 19 and the hook-like part 39 of the tumbler 36, wherein both inclined faces of the rib 40 and the hook-like part 39 ensure a smooth guiding. In this position of the lever 22 in which it is locked to one side, the shoulder 35 around the guide pin part 28 is lying right under the recess 33 in the flange 32 of the longitudinal guide 4.

FIG. 16a and 16b show the position of the adjusting mechanism in which the panel 3 is completely closed. With respect to FIG. 15a and 15b the slide 19 has been moved a distance backwardly whereby the slide 19 and consequently the slots 25, 26 and 29, 30 have been displaced in the longitudinal direction with respect to the lever 22. As a result the pin parts 23, 24 and 27, 28 have partially passed through the slots 25, 26 and 29, 30 wherein the pin parts 27 and 28 have reached the apex of the guide slots 29 and 30. The lever 22 is then also in its highest position in which the upper side of the panel 3 is flush with the upper side of the fixed roof 1 of the vehicle. By the pivoting movement of the lever 22 the shoulder 35 of the lever 22 has entered the recess 33 in the flange 32 of the longitudinal guide 4, so that the engagement between the shoulder 35 and the recess 33 effects a locking of the lever 22 in both directions. The tumbler 36 is pivoted from its one stop position and almost into its other stop position due to the engagement between the rear inclined face of the rib 40 of the slide 19 and the hook-like part 38.

When the slide 19 is displaced further backwardly the several pin parts of the lever 22 will further pass through the several slots in the slide 19 whereby the lever 22 pivots downwardly again since the pin parts 27 and 28 are displaced downwardly in the guide slots 29 and 30. In the lowest position of the pin parts 27 and 28 in the guide slots 29 and 30 the shoulder 35 of the lever 22 has just left the recess in the flange 32 of the longitudinal guide 4 so that the lever is not locked anymore in rearward direction and the slide 19 and the lever 22 can be slid further rearwardly as a unit thereby displacing the panel 3 rearwardly under the fixed roof 1 to a wholly or partially opened position.

FIG. 17a and 17b show the position of the adjusting mechanism in which the panel 3 has arrived under the roof opening 2 from its rearwardly displaced position. In this position the pin part 24 is retained by the hook-like part 39 on the tumbler 36 so that a further forward movement of the slide 19 is not followed by the lever 22. When the slide 19 is displaced further forwardly the lever 22 then carries out the same movements as describes with reference to FIG. 15 and 16, but in opposite sense.

Generally, in the case of a substantially rectangular panel 3, there will be provided a lever 22 near every corner. Then both levers 22 on either longitudinal side of the panel 3 can be mounted in one single long slide 19, but on the other hand it is possible that four small slides 19 with their respective lever 22 are provided. In principal only one tumbler 36 is required because when one lever 22 is retained in the longitudinal direction, the other levers 22 also cannot be displaced further on due to the interconnection of the levers 22 through the panel 3. However, the use of one tumbler 36 for each longitudinal guide 4 is more favorable for the operation.

The invention is not restricted to the embodiments described herein before and shown in the drawing by way of example, which can be varied in different manners within the scope of the invention. In principal it is possible to design a sliding roof of which the panel is adapted to be slid only forwardly, preferably below the fixed roof, in order to create only a venting opening on the rear side to thereby imitate the operation of a traditional tilting roof. It is also possible to combine the forward sliding motion from the closed position with another non-sliding movement.

I claim:

1. A sliding roof for a vehicle having a fixed roof (1) provided with a roof opening (2) therein, which has two longitudinal side edges, comprising
   a longitudinal guide (4) extending along one longitudinal side edge of the roof opening (2); and
   a panel (3) having means sliding in the longitudinal guide (4) such that the panel (3) is adapted to be slid from a closed position in which it closes the roof opening (2) to rearward open positions wherein the panel (3) is at least partially under the fixed roof (1) rearward of the roof opening (2), and to forward open positions wherein the panel (3) is at least partially under the fixed roof (1) forward of the roof opening (2).

2. A sliding roof according to claim 2, wherein the panel (3), in its closed position, is lying under the roof opening (2).

3. A sliding roof according to claim 2, wherein the panel (3) is larger than the roof opening (2).

4. A sliding roof according to claim 1, further comprising a height adjusting means attached to the sliding means wherein the panel (3), in its closed position, is lying with the roof opening (2) and is moved first downwardly by the height adjusting means from the closed position before it is slide backwardly and forwardly, respectively.

5. A sliding roof according to claim 4, wherein the panel (3) is substantially rectangular having four corners and is supported near at least one of the four corners by the height adjusting means.

6. A sliding roof according to claim 5, wherein the adjusting means comprises a lever (22) pivotable about a horizontal transverse shaft (23, 24) to the sliding means at one end and pivotally connected to the panel (3) at another end.

7. A sliding roof according to claim 6, wherein the lever (22) is locked with respect to the respective sliding means (19) during the sliding movement of the panel (3) and is locked in longitudinal direction with respect to the longitudinal guide (4) when the panel (3) is in the closed position by means of locking means (24, 28, 33, 35, 36–39) and is slidable with respect to the respective sliding means (19) through a forcing guide during the height adjustment of the panel (3).

8. A sliding roof according to claim 7, wherein the forcing guide comprises a guide slot (29, 30) formed in the sliding means (19) extending with a vertical component, and a guide pin (27, 28) formed on the lever (22) between the ends thereof and being in engagement with the guide slot (29, 30), the lever being guided at said one end in the sliding means.

9. A sliding roof according to claim 7, wherein the locking means comprise a tumbler (36) arranged in the longitudinal guide (4) and being pivotable about a vertical shaft (37) and serving as a bi-directional stop for at lest one said lever (22) and retaining this lever (22) when the panel (3) arrives under the roof opening (2) from forward and rearward open positions, and a recess (33) formed in the longitudinal guide (4), in which a shoulder (35), formed on the lever (22), engages when the lever (22) is pivoted upwardly.

10. A sliding roof according to claims 1, wherein the panel (3) is made of transparent material and there is also provided a slidable sunshade (8).

11. A sliding roof according to claim 10, wherein the longitudinal guide (4) is attached to a stationary frame (5) and wherein the panel (3) is slidable rearwardly and forwardly between the frame (5) and the fixed roof (1), and the sunshade (8) being slidable rearwardly between the frame (5) and a roof lining (6) of the vehicle.

* * * * *

UNITED STATES PATENT AND TRADEMARK OFFICE
CERTIFICATE OF CORRECTION

PATENT NO. : 5,040,845

DATED : August 20, 1991

INVENTOR(S) : Johannes N. Huyer

It is certified that error appears in the above-identified patent and that said Letters Patent is hereby corrected as shown below:

Col. 7, line 47, delete "claim 2", insert --claim 1--.

Col. 8, line 4, delete "with", insert --within--.

Col. 8, line 6, delete "slide", insert --slid--.

Signed and Sealed this

Third Day of November, 1992

*Attest:*

DOUGLAS B. COMER

*Attesting Officer*  Acting Commissioner of Patents and Trademarks